US012088374B2

(12) United States Patent
Fukuzono et al.

(10) Patent No.: US 12,088,374 B2
(45) Date of Patent: Sep. 10, 2024

(54) WIRELESS COMMUNICATION SYSTEM, WIRELESS COMMUNICATION METHOD, TRANSMITTING STATION DEVICE AND RECEIVING STATION DEVICE

(71) Applicant: NIPPON TELEGRAPH AND TELEPHONE CORPORATION, Tokyo (JP)

(72) Inventors: Hayato Fukuzono, Musashino (JP); Keita Kuriyama, Musashino (JP); Masafumi Yoshioka, Musashino (JP); Tsutomu Tatsuta, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 338 days.

(21) Appl. No.: 17/630,227

(22) PCT Filed: Aug. 21, 2019

(86) PCT No.: PCT/JP2019/032652
§ 371 (c)(1),
(2) Date: Jan. 26, 2022

(87) PCT Pub. No.: WO2021/033292
PCT Pub. Date: Feb. 25, 2021

(65) Prior Publication Data
US 2022/0278721 A1    Sep. 1, 2022

(51) Int. Cl.
*H04B 7/06*    (2006.01)
*H04B 7/0452*    (2017.01)
*H04L 27/26*    (2006.01)

(52) U.S. Cl.
CPC ......... *H04B 7/0617* (2013.01); *H04B 7/0452* (2013.01); *H04B 7/0626* (2013.01); *H04L 27/2607* (2013.01)

(58) Field of Classification Search
CPC .................................................. H04L 27/2607
(Continued)

(56) References Cited

U.S. PATENT DOCUMENTS

| 11,616,551 | B2* | 3/2023 | Großmann | ........... H04B 7/0634 |
| | | | | 370/329 |
| 11,658,778 | B2* | 5/2023 | Fehrenbach | ........ H04L 27/3488 |
| | | | | 370/329 |
| 2011/0013575 | A1* | 1/2011 | Liao | ......................... H04B 1/00 |
| | | | | 370/476 |

OTHER PUBLICATIONS

Keita Kuriyama, Hayato Fukuzono, Masafumi Yoshioka, Tsutomu Tatsuta, "Wide-band Single Carrier MIMO System Using FIR-Type Transmit Beamforming and Bi-Directional Receive Equalization", Mar. 2019, IEICE General Conference, B-5-105.

* cited by examiner

*Primary Examiner* — Anthony Mejia
(74) *Attorney, Agent, or Firm* — Harness, Dickey & Pierce, P.L.C.

(57) ABSTRACT

A transmission station device includes a training signal generation unit, a CP addition unit, and a transmission beamforming unit that performs transmission beamforming processing in a time domain using a transmission weight for removing inter-antenna interference. A reception station device includes a CP removal unit, a channel estimation unit, and an equalization unit that performs equalization processing for removing inter-symbol interference in a frequency domain using a reception weight. Either of the transmission station device or the reception station device is provided with a weight calculation unit that calculates the transmission weight and the reception weight based on the channel response, an effective CIR length calculation unit that calculates an effective CIR length between antennas, and a CP length setting unit that sets, to the CP length, a maximum (Continued)

CIR length among the CIR lengths of respective items of the reception weight.

6 Claims, 7 Drawing Sheets

(58) Field of Classification Search
USPC .......................................................... 370/329
See application file for complete search history.

WIRELESS COMMUNICATION SYSTEM, WIRELESS COMMUNICATION METHOD, TRANSMITTING STATION DEVICE AND RECEIVING STATION DEVICE

CROSS-REFERENCE TO RELATED APPLICATIONS

This application is a 371 U.S. National Phase of International Application No. PCT/JP2019/032652, filed on Aug. 21, 2019. The entire disclosure of the above application is incorporated herein by reference.

TECHNICAL FIELD

The present invention relates to a technology for avoiding degradation of communication quality due to inter-block interference in a multiple-input multiple-output (MIMO)-single carrier (SC)-frequency domain equalization (FDE) type wireless communication system that performs finite impulse response (FIR) type transmission beamforming processing.

BACKGROUND ART

To perform wideband SC-MIMO transmission in a communication environment with frequency selective fading, processing for removing inter-antenna interference (inter-user interference in the case of multi user (MU)-MIMO/inter-stream interference in the case of single user (SU)-MIMO) caused by spatial spread of a plurality of antennas and removing inter-symbol interference caused by temporal spread of channel characteristics is required.

In a general MIMO-SC-FDE type wireless communication system, in a transmission station device and a reception station device, a transmission signal and a reception signal are converted into signals in a frequency domain by a discrete Fourier transform (DFT)/fast Fourier transform (FFT) and inverse DFT (IDFT)/inverse FFT (IFFT), and transmission beamforming processing and waveform equalization processing are performed in the frequency domain. However, when processing in the frequency domain is performed, there is a problem that a buffer for performing a DFT/IDFT is required, and a processing load increases. On the other hand, a method of removing inter-user interference by performing FIR-type transmission beamforming in a time domain has been proposed (see NPL 1).

CITATION LIST

Non Patent Literature

NPL 1: Keita Kuriyama, Hayato Fukuzono, Masafumi Yoshioka, Tsutomu Tatsuta, "Wide-band Single-Carrier MIMO System Using FIR-Type Transmit Beamforming and Bi-Directional Receive Equalization," March 2019 IEICE General Conference B-5-105.

SUMMARY OF THE INVENTION

Technical Problem

In a MIMO-SC-FDE type wireless communication system, when a transmission station device performs FIR-type transmission beamforming processing in a time domain and a reception station device performs waveform equalization processing in a frequency domain, block transmission is performed, thus it is necessary to add a cyclic prefix (CP) between blocks. However, when FIR type transmission beamforming processing is performed on a data signal of a block to which the CP has been added, an equivalent channel impulse response (CIR) length (referred to as a CIR length) is extended, and when the equivalent CIR length exceeds a length of the CP (referred to as a CP length), there is a problem that distortion is caused by inter-block interference and transmission quality deteriorates. In NPL 1, because the block transmission is not performed to perform the waveform equalization processing in a time domain, the CP is not added and the above-described problem does not occur.

An object of the present invention is to provide a wireless communication system, a wireless communication method, a transmission station device, and a reception station device capable of avoiding degradation in communication quality due to inter-block interference by adjusting a CP length based on an equivalent CIR length extended by FIR type transmission beamforming processing in a MIMO-SC-FDE scheme for performing FIR-type transmission beamforming.

Means for Solving the Problem

A wireless communication system according to the present invention includes a transmission station device and a reception station device and performs transmission using a MIMO-SC-FDE scheme between the transmission station device and the reception station device. The transmission station device includes: a training signal generation unit configured to generate a predetermined known signal for the reception station device to estimate a channel response; a CP addition unit configured to add a CP with a predetermined CP length for removing inter-block interference in each transmission signal block; and a transmission beamforming unit configured to perform transmission beamforming processing in a time domain using a transmission weight for removing inter-antenna interference. The reception station device includes: a CP removal unit configured to remove the CP added to a received signal; a channel estimation unit configured to receive the known signal and estimate a channel response; and an equalization unit configured to perform equalization processing for removing inter-symbol interference in a frequency domain using a reception weight. Either of the transmission station device or the reception station device is provided with: a weight calculation unit configured to calculate the transmission weight and the reception weight based on the channel response; an effective CIR length calculation unit configured to calculate an effective CIR length between a plurality of antennas based on the channel response; and a CP length setting unit configured to calculate CIR lengths of respective items of the reception weight based on the effective CIR length and set a maximum CIR length among the CIR lengths of the respective items as the CP length.

A wireless communication method according to the present invention is a wireless communication method for performing transmission using a MIMO-SC-FDE scheme between a transmission station device and a reception station device. The method includes, by the transmission station device: training-signal generating for generating a predetermined known signal for the reception station device to estimate a channel response; CP adding for adding a CP with a predetermined CP length for removing inter-block interference in each transmission signal block; and transmission beamforming for forming a transmission beam in a time domain using a transmission weight for removing inter-antenna interference. The method includes, by the reception station device: CP removing for removing the CP added to a received signal; channel estimating for receiving the known signal and estimating the channel response; and equalizing for removing inter-symbol interference in a frequency domain using a reception weight. The method includes, by either the transmission station device or the reception station device: calculating the transmission weight and the reception weight based on the channel response, calculating an effective CIR length between antennas based on the channel response, and CP length setting for calculating CIR lengths of respective items of the reception weight based on the effective CIR length and setting, to the CP length, a maximum CIR length among the CIR lengths of the respective items.

A transmission station device according to the present invention is a transmission station device configured to perform transmission to and from a reception station device using a MIMO-SC-FDE scheme. The transmission station device includes: a training signal generation unit configured to generate a predetermined known signal for the reception station device to estimate a channel response; a CP addition unit configured to add a CP with a predetermined CP length for removing inter-block interference in each transmission signal block; a transmission beamforming unit configured to perform transmission beamforming processing in a time domain using a transmission weight for removing inter-antenna interference; a weight calculation unit configured to calculate, based on the channel response estimated by the reception station device, the transmission weight and a reception weight used for equalization of the reception station device; an effective CIR length calculation unit configured to calculate, based on the channel response, an effective CIR length between a plurality of antennas; and a CP length setting unit configured to calculate CIR lengths of respective items of the reception weight based on the effective CIR length and set, to the CP length, a maximum CIR length among the CIR lengths of the respective items.

A reception station device according to the present invention is a reception station device configured to perform transmission to and from a transmission station device using a MIMO-SC-FDE scheme. The reception station device includes: a CP removal unit configured to remove a CP with a predetermined CP length added to a received signal; a channel estimation unit configured to receive a known signal and estimate a channel response; an equalization unit configured to perform equalization for removing inter-symbol interference in a frequency domain using a reception weight; a weight calculation unit configured to calculate, based on the channel response, a transmission weight used for transmission beamforming processing by the transmission station device and the reception weight; an effective CIR length calculation unit configured to calculate an effective CIR length between a plurality of antennas based on the channel response; and a CP length setting unit configured to calculate CIR lengths of respective items of the reception weight based on the effective CIR length and set, to the CP length, a maximum CIR length among the CIR lengths of the respective items.

Effects of the Invention

The wireless communication system, the wireless communication method, the transmission station device, and the reception station device according to the present invention are capable of avoiding degradation in communication quality due to inter-block interference by adjusting a CP length based on an equivalent CIR length extended by FIR-type transmission beamforming processing in a MIMO-SC-FDE scheme for performing FIR-type transmission beamforming.

DESCRIPTION OF EMBODIMENTS

Hereinafter, an embodiment of a wireless communication system, a wireless communication method, a transmission station device, and a reception station device according to the present invention will be described with reference to the drawings.

Figure 1:
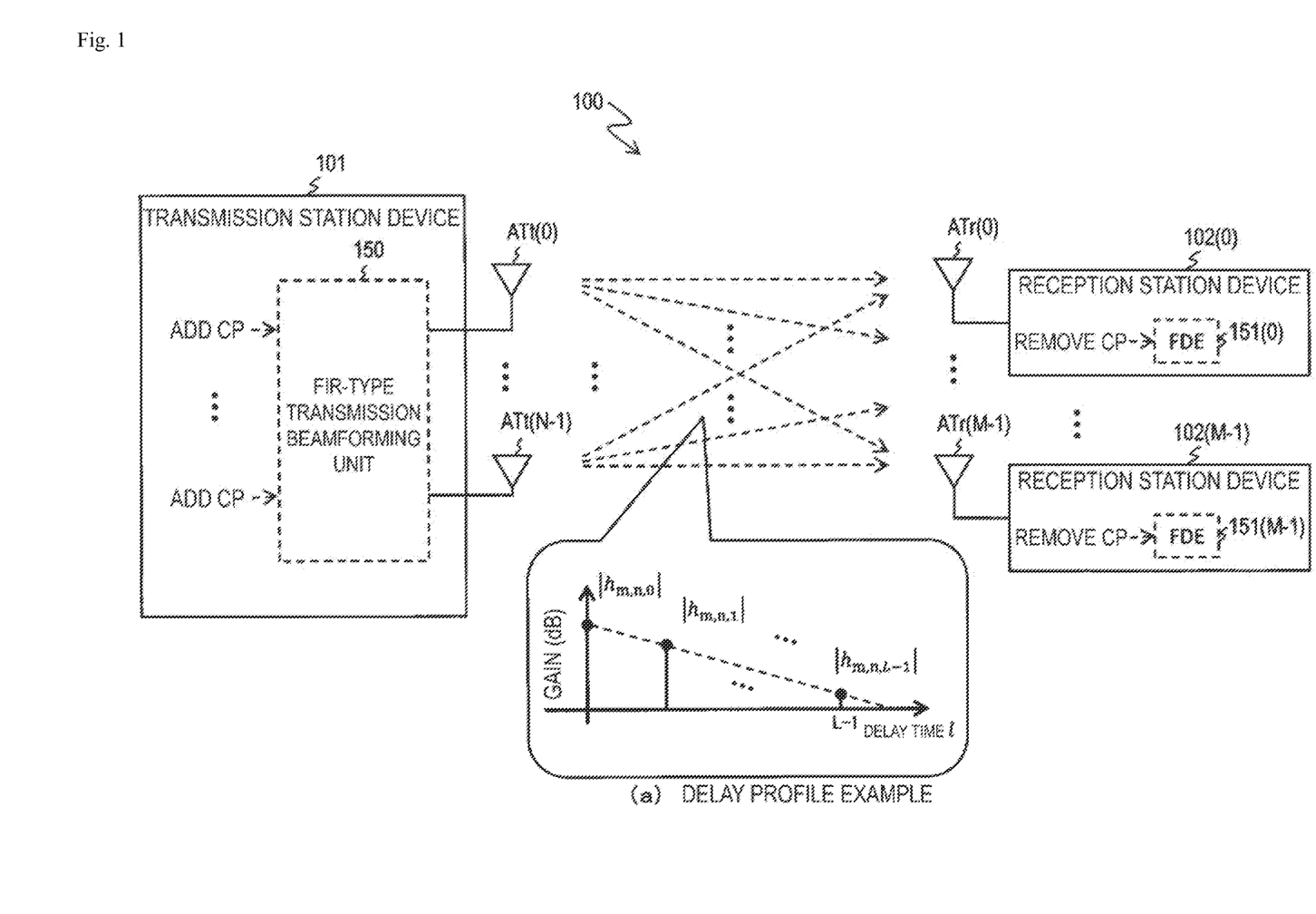
FIG. 1 is a diagram illustrating a basic configuration example of a wireless communication system according to an embodiment of the present invention.

FIG. 1 illustrates a basic configuration example of a wireless communication system 100 according to the present embodiment. In FIG. 1, the wireless communication system 100 includes a transmission station device 101 and a plurality of (M: M is an integer and M≥2) reception station devices 102(0) to 102(M−1), and communication is performed between the transmission station device 101 and the plurality of reception station devices 102 using a MIMO-SC-FDE scheme. Here, when MIMO transmission using transmission beamforming is performed in an SC-FDE system, usually, DFT and IDFT are performed and transmission beamforming processing is performed in the frequency domain, whereas in the wireless communication system 100 according to the present embodiment, FIR-type transmission beamforming processing in a time domain is performed in the transmission station device 101. Although FIG. 1 illustrates an example of MU-MIMO, the same can be applied to SU-MIMO. Here, in the following description, in description common to the reception station devices 102(0) to 102(M−1), a (number) at the end of the reference sign is omitted and the reception station device is referred to as a "reception station device 102," and when a specific reception station device 102 is indicated, a (number) is added to the end of the reference sign and the reception station device is referred to as, for example, reception station device 102(0). The same applies to a case in which a plurality of similar blocks, such as an antenna ATt of the transmission station device 101 and an antenna ATr of the reception station device 102, are disposed.

In FIG. 1, the transmission station device 101 includes a plurality of (N: N is an integer and N≥2) antennas ATt(0) to ATt(N−1) and an FIR-type transmission beamforming unit 150. The FIR-type transmission beamforming unit 150 receives a transmission signal of each user to which a CP has been added, performs the FIR-type transmission beamforming processing in a time domain, and transmits a transmission signal in which inter-user interference has been removed from the N antennas ATt. Here, in the case of MU-MIMO having a plurality of reception station devices 102, interference is described as inter-user interference, but in the case of SU-MIMO, interference is described as inter-stream interference. In each case, the interference corresponds to inter-antenna interference in which signals transmitted and received between a plurality of antennas on a transmitting side and a receiving side affect each other.

The reception station device 102(0) receives a signal transmitted from the transmission station device 101, removes the CP added to each block, and then performs inter-symbol interference equalization processing in the frequency domain using a frequency domain equalization unit (FDE) 151(0). The same processing as that of the reception station device 102(0) is also performed in the reception station devices 102(1) to 102(M−1).

Here, FIG. 1(a) illustrates an example of a delay profile between an antenna ATt(n) of the transmission station device 101 and an antenna ATr(m) of the reception station device 102. A horizontal axis indicates a delay time 1 and a vertical axis indicates a gain (dB). n is an integer from 0 to N−1, and m is an integer from 0 to M−1. ATt(n) indicates any of N antennas ATt of the transmission station device 101, and ATr(m) indicates any of M antennas ATr of the reception station device 102. Further, L (L: a positive integer) is a CIR length of CIR having delay waves with a maximum delay in the CIR. The delay time of 0, 1, ..., L−1 shown in FIG. 1(a) correspond to an order of a delay operator, which will be described below.

In FIG. 1(a), $|h_{m,n,0}|$ indicates a gain (dB) of the delay time of order 0. Similarly, $|h_{m,n,1}|$ indicates a gain of the delay time of order 1, and $|h_{m,n,L-1}|$ indicates a gain of the delay time of order (L−1).

Here, a CIR($H_{m,n}(z)$) between the antenna ATt(n) of the transmission station device 101 and the antenna ATr(m) of the reception station device 102 is expressed by Equation (1). In Equation (1), z of $z^{-1}$ is the delay operator that performs a time shift.

[Math. 1]

$$H_{m,n}(z) = \sum_{l=0}^{L-1} h_{m,n,l} z^{-l} \quad (1)$$

A CIR in a MIMO channel between the transmission station device 101 and the reception station device 102 is expressed by an M×N transfer function determinant H(z) in which the CIR between the antennas in Equation (1) is an element, as shown in Equation (2).

[Math. 2]

$$H(z) = \begin{bmatrix} H_{0,0}(z) & H_{0,1}(z) & \cdots \\ H_{1,0}(z) & & \\ \vdots & & \end{bmatrix} \quad (2)$$

Here, an inverse matrix of H(z) is expressed by Equation (3) in the case of being expressed using an adjoint matrix adj[H(z)] of H(z).

[Math. 3]

$$H(z)^{-1} = \frac{1}{\det[H(z)]} adj[H(z)] \quad (3)$$

In Equation (3), det(■) and adj(■) indicate a determinant and an adjugate matrix, respectively. adj differs from an adjoint matrix indicating a Hermitian transpose.

It is known that the adjugate matrix adj [H(z)] is used for a transmission weight W(z) of the transmission beamforming processing so that a channel response determinant H(z) is diagonalized and each diagonal element becomes equal to a determinant det[H(z)] (see, for example, NPL 1).

The channel response subjected to the transmission beamforming processing with adj[H(z)] as the transmission weight W(z) is equivalently expressed by Equation (4). Here, 1 is an identity matrix.

[Math. 4]

$$H(z)W(z) = \det[H(z)]I \quad (4)$$

$$= \begin{bmatrix} \det[H(z)] & 0 & \cdots & 0 \\ 0 & \ddots & \ddots & \vdots \\ \vdots & \ddots & \ddots & 0 \\ 0 & \cdots & 0 & \det[H(z)] \end{bmatrix}$$

Thus, because the transmission beamforming processing is performed with the adj[H(z)] as the transmission weight W(z) so that the channel response determinant H(z) is diagonalized and non-diagonal components indicating inter-user interference components become 0, the inter-user interference is removed. In the reception station device 102, the FDE 151 divides the data signal in the frequency domain by det[H(z)] converted into the frequency domain, so that the equalization processing is performed and the inter-symbol interference is removed.

Here, the case of 3×3 MIMO will be described as an example with N=M=3. In Equation (3) described above, the channel response determinant H(z) of the 3×3 MIMO is expressed by Equation (5).

[Math. 5]

$$H(z) = \begin{bmatrix} H_{0,0}(z) & H_{0,1}(z) & H_{0,2}(z) \\ H_{1,0}(z) & H_{1,1}(z) & H_{1,2}(z) \\ H_{2,0}(z) & H_{2,1}(z) & H_{2,2}(z) \end{bmatrix} \quad (5)$$

The determinant det[H(z)] of H(z) shown in Equation (5) is expressed by Equation (6).

[Math. 6]

$$\det[H(z)] = \quad (6)$$

$$H_{0,0}(z)H_{1,1}(z)H_{2,2}(z) + H_{0,1}(z)H_{1,2}(z)H_{2,0}(z) + H_{0,2}(z)H_{1,0}(z)H_{2,1}(z) -$$

$$H_{0,2}(z)H_{1,1}(z)H_{2,0}(z) - H_{1,2}(z)H_{2,1}(z)H_{0,0}(z) - H_{0,1}(z)H_{1,0}(z)H_{2,2}(z)$$

Thus, when the transmission beamforming processing is performed with adj[H(z)] as the transmission weight, the equivalent CIR becomes det[H(z)], but the CIR length is extended because product-sum calculation in a time domain is performed in the FIR-type transmission beamforming processing. In particular, when the CIR length is larger than the CP length, there arises a problem that inter-block interference occurs and the communication quality deteriorates. Further, when the CP length is made too large, there arises a problem that the transmission efficiency is degraded.

Figure 2:
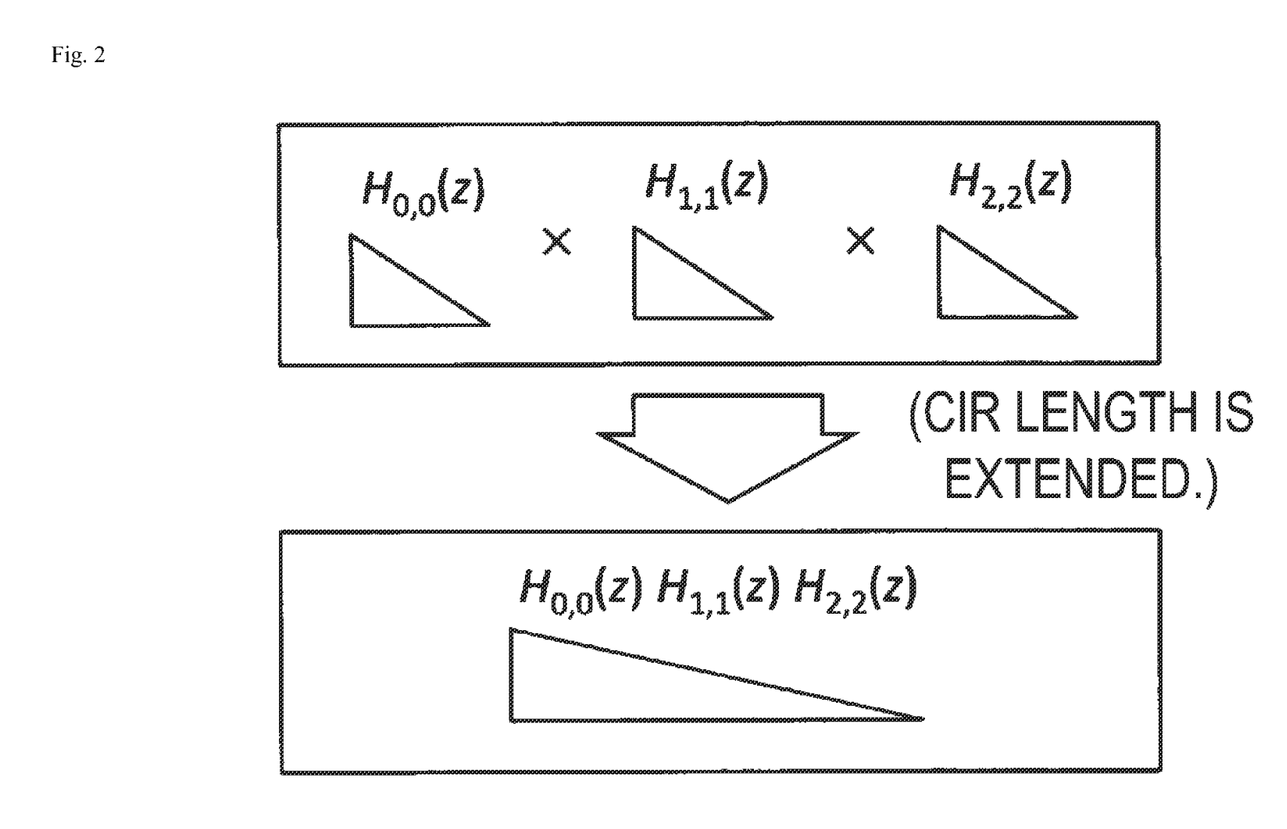
FIG. 2 is a diagram illustrating an image in which a CIR is extended.

FIG. 2 illustrates an image in which the CIR is extended. In FIG. 2, $H_{0,0}(z)$, $H_{1,1}(z)$, $H_{2,2}(z)$ indicates a first item of det[H(z)] in Equation (6), and the same applies to the second to sixth items. In FIG. 2, a CIR length of each element ($H_{0,0}(z)$, $H_{1,1}(z)$, and $H_{2,2}(z)$) of the channel response determinant H(z) of 3×3 MIMO is small, whereas the CIR length of the first item $H_{0,0}(z)$ $H_{1,1}(z)$ $H_{2,2}(z)$ of the determinant det[H(z)] is extended by the product-sum calculation in the FIR-type transmission beamforming processing, and it becomes larger than the individual CIR lengths, as illustrated in FIG. 2.

Thus, when an equivalent CIR length of the channel response determinant H(z) is extended through the FIR-type transmission beamforming processing and the equivalent CIR length becomes larger than the CP length, inter-block interference occurs.

Thus, the wireless communication system 100 according to the present embodiment has a function of avoiding inter-block interference by estimating the equivalent CIR length in advance and adaptively adjusting the CP length in either the transmission station device 101 or the reception station device 102.

Method of Adjusting CP Length

Next, a method of adjusting the CP length will be described. In FIG. 1 described above, the transmission station device 101 transmits a known signal shared with the reception station device 102, and the reception station device 102 estimates H(z) based on the known signal received from the transmission station device 101.

For CIR($H_{m,n}(z)$) between antennas of H(z), each effective CIR length ($L_{m,n}$) is determined. Here, for example, a threshold value (for example, −25 dB) of a gain of the CIR is determined in advance as a criterion for determining the effective CIR length, a length to a portion in which the gain is equal to or greater than the threshold value is set as the effective CIR length, and a portion in which the gain is smaller than the threshold value is ignored. Next, the equivalent CIR length of each item of the determinant of Equation (6) is calculated, and a maximum value of the equivalent CIR length is calculated. The maximum CIR length is set as the CP length.

For example, the CIR length of the first item ($H_{0,0}(z)H_{1,1}(z)H_{2,2}(z)$) of Equation (6) is calculated as $L_{0,0}+L_{1,1}+L_{2,2}-2$. Here, because an order of a product of a transfer function $H_{0,0}(z)$ and a transfer function $H_{1,1}(z)$ (corresponding to the CIR length) is $L_{0,0}+L_{1,1}-1$, an order of a product of a transfer function ($H_{0,0}(z)$ $H_{1,1}(z)$) and a transfer function $H_{2,2}(z)$ is $(L_{0,0}+L_{1,1}-1)+L_{2,2}-1$, and $L_{0,0}+L_{1,1}+L_{2,2}-2$ is derived.

Thus, respective CIR lengths of the first to sixth items of Equation (6) are calculated as shown in Equations (7) to (12).

CIR length of the first item: CIR(1)=
$$L_{0,0}+L_{1,1}+L_{2,2}-2 \quad (7)$$

CIR length of the second item: CIR(2)=
$$L_{0,1}+L_{1,2}+L_{2,0}-2 \quad (8)$$

CIR length of the third item: CIR(3)=
$$L_{0,2}+L_{1,0}+L_{2,1}-2 \quad (9)$$

CIR length of the fourth item: CIR(4)=
$$L_{0,2}+L_{1,1}+L_{2,0}-2 \quad (10)$$

CIR length of the fifth item: CIR(5)=
$$L_{1,2}+L_{2,1}+L_{0,0}-2 \quad (11)$$

CIR length of the sixth item: CIR(6)=
$$L_{0,1}+L_{1,0}+L_{2,2}-2 \quad (12)$$

The CIR lengths of the first to sixth items are compared, the maximum CIR length is selected, and a value of the maximum CIR length is set as the CP length. Thus, even when the transmission station device 101 performs transmission beamforming processing on the signal to which the CP has been added and transmits the resultant signal, a range of inter-block interference of a reception signal in the reception station device 102 falls within the CP length, and thus it is possible to remove the inter-block interference by removing the CP by the reception station device 102.

Configuration Example (1) of Wireless Communication System 100

Figure 3:
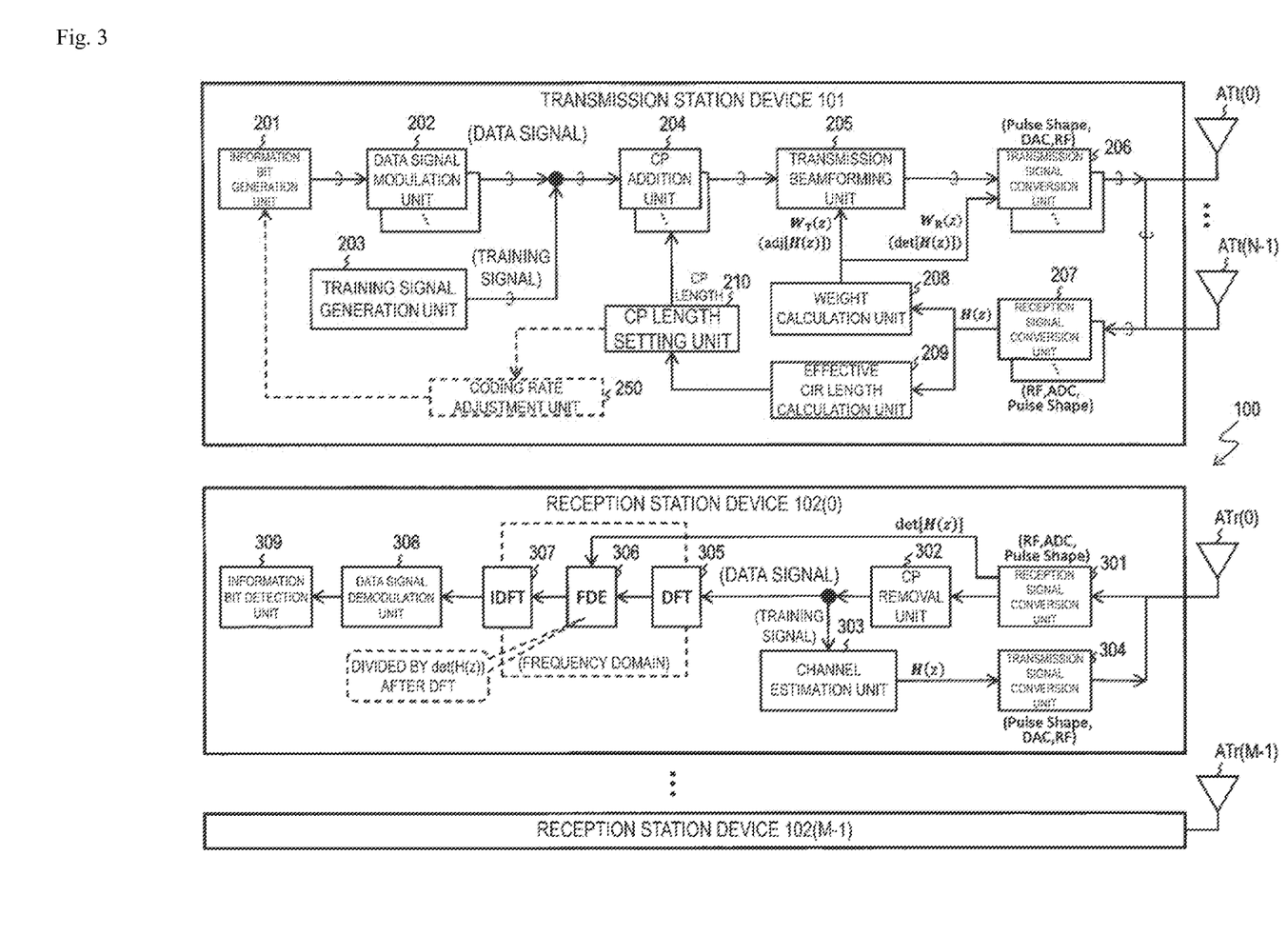
FIG. 3 is a diagram illustrating Configuration Example (1) of the wireless communication system according to the present embodiment.

FIG. 3 illustrates Configuration Example (1) of the wireless communication system 100 according to the present embodiment. The wireless communication system 100 is an MU-MIMO system in which the transmission station device 101 and the plurality of reception station devices 102 perform communication using a MIMO-SC-FDE scheme.

In FIG. 3, the transmission station device 101 includes an information bit generation unit 201, a data signal modulation unit 202, a training signal generation unit 203, a CP addition unit 204, a transmission beamforming unit 205, a transmission signal conversion unit 206, a reception signal conversion unit 207, a weight calculation unit 208, an effective CIR length calculation unit 209, a CP length setting unit 210, and antennas ATt(0) to ATt(N−1). The coding rate adjustment unit 250 may be included, as will be described below.

The information bit generation unit 201 generates a data information bit for each user that is transmitted to the reception station device 102. The data information bit is, for example, a bit sequence corresponding to a data signal input from the outside (not illustrated), a data signal generated internally, or the like. The information bit generation unit 201 may have an error correction coding function or an interleaving function for generating an error correction code at a predetermined coding rate.

The data signal modulation unit 202 outputs a data signal obtained by modulating the bit sequence for each user output by the information bit generation unit 201 using a predetermined modulation scheme (for example, quadrature amplitude modulation (QAM)). The transmission station device 101 of FIG. 3 outputs a data signal obtained by modulating the bit sequence for each user output by the information bit generation unit 201. In the present embodiment, the data signal modulation unit 202 corresponding to the number (N) of antennas ATt is included.

The training signal generation unit 203 generates a known signal (referred to as a training signal) for estimating a channel impulse response (CIR) and outputs the training signal to the CP addition unit 204 (training signal generation processing). The training signal is a predetermined signal obtained by modulating predetermined information such as a preamble for signal detection (for example, a specific pattern such as an alternating pattern of "01") using a modulation scheme such as phase shift keying (PSK) that is less susceptible to interference, and is used for the reception station device 102 to estimate the CIR. Information on the training signal transmitted by the transmission station device 101 is known to the reception station device 102 in advance.

The CP addition unit 204 adds a CP for removing the inter-block interference to the data signal output by the data signal modulation unit 202 and the training signal output by the training signal generation unit 203 (CP addition processing). Here, a length of the CP to be added (a CP length) is set by the CP length setting unit 210, which will be described below.

The transmission beamforming unit 205 uses a transmission weight $W_T(z)$ calculated by the weight calculation unit 208, which will be described below, to perform the transmission beamforming processing for removing inter-user interference on the transmission signal to which the CP has been added by the CP addition unit 204. The transmission beamforming unit 205 may have a function of normalizing transmission power.

The transmission signal conversion unit 206 includes a pulse shaping (necessary band limitation is performed by a roll-off filter or the like) unit, a digital to analog conversion (DAC) unit, a radio frequency (RF) unit, and the like, and performs processing for converting a signal output by the transmission beamforming unit 205 into a high frequency signal and transmitting the high frequency signal from the antenna ATt. Further, the transmission signal conversion unit 206 transmits information on the reception weight $W_R(z)$ calculated by the weight calculation unit 208 to the reception station device 102. A function of a modulation unit that modulates the information on the reception weight $W_R(z)$ into a baseband signal may be included in a transmission signal conversion unit 304 or may be included in the weight calculation unit 208. Here, the respective data signals to the plurality of reception station devices 102 output by the transmission beamforming unit 205 are converted into high frequency signals and transmitted from the respective antennas ATt(0) to ATt(N−1).

The reception signal conversion unit 207 includes an RF unit, an analog to digital conversion (ADC) unit, a pulse shaping unit, and the like, and frequency-converts the reception signal at a high frequency received by each of the antennas ATt(0) to ATt(N−1) into a baseband signal at a low frequency. Here, in Configuration Example (1), the reception signal conversion unit 207 receives a signal including information on CIR(H(z)) from each reception station device 102, converts the signal into a baseband signal, and outputs the baseband signal to the weight calculation unit 208 and the effective CIR length calculation unit 209. A function of a demodulation unit that demodulates the CIR information from the baseband signal may be included in the reception signal conversion unit 207 or may be included in the weight calculation unit 208 and the effective CIR length calculation unit 209.

The weight calculation unit 208 uses CIR(H(z)) estimated by the channel estimation unit 303 on the reception station device 102 side to calculate the transmission weight $W_T(z)$ for performing transmission beamforming processing in the transmission beamforming unit 205 and the reception weight $W_R(z)$ for performing inter-symbol interference equalization processing by the reception station device 102 (weight calculation processing). Here, the transmission weight $W_T(z)$ is adj[H(z)], and the reception weight $W_R(z)$ is det[H(z)], as described in Equations (3) and (4) or the like. The transmission weight $W_T(z)$ is output to the transmission beamforming unit 205, and the reception weight $W_R(z)$ is transmitted from the transmission signal conversion unit 206 to the reception station device 102.

The effective CIR length calculation unit 209 calculates each effective CIR length ($L_{m,n}$) for CIR($H_{m,n}(z)$) between the antennas of the transfer function determinant H(z) (effective CIR length calculation processing). For example, the effective CIR length of $H_{0,0}(z)$ in Equation (5) is calculated as $L_{0,0}$, the effective CIR length of $H_{1,1}(z)$ is calculated as $L_{1,1}$, and the effective CIR length of $H_{2,2}(z)$ is calculated as $L_{2,2}$.

The CP length setting unit 210 calculates, for example, a CIR length of each item of the determinant det[H(z)] of Equation (6) based on the effective CIR length calculated by the effective CIR length calculation unit 209. The CP length setting unit 210 calculates the maximum CIR length among the CIR lengths of the respective items as described in Equations (7) to (12), and sets the maximum CIR length as the CP length in the CP addition unit 204 (CP length setting processing).

The coding rate adjustment unit 250 adjusts the coding rate based on the CP length set by the CP length setting unit 210 so that the transmission efficiency before adjusting the CP length and the transmission efficiency after adjusting the CP length are the same (coding rate adjustment processing). The adjustment of the coding rate is performed when the information bit generation unit 201 has an error correction coding function. The coding rate adjustment unit 250 outputs the adjusted coding rate to the information bit generation unit 201, and the information bit generation unit 201 performs error correction coding processing at the coding rate given by the coding rate adjustment unit 250. It is assumed that information on the adjusted coding rate is transmitted from the transmission signal conversion unit 206 to the reception station device 102, and is used when the information bit detection unit 309 of the reception station device 102 performs error correction and decoding processing (not illustrated).

Thus, in the wireless communication system 100 according to the present embodiment, the transmission station device 101 transmits a training signal for estimating the CIR, receives a CIR estimation result from the reception station device 102, and performs transmission beamforming processing using the transmission weight for removing the inter-user interference calculated based on the CIR estimation result. At the same time, the transmission station device 101 calculates the maximum CIR length in each item of the determinant det[H(z)] of the reception weight, and sets the maximum CIR length as the CP length. Thus, the wireless communication system 100 according to the present embodiment can remove the inter-block interference because the range of inter-block interference of the reception signal in the reception station device 102 side falls within the CP length.

Next, each of the units of the reception station device 102(0) will be described. In the case of MU-MIMO shown in FIG. 3, M reception station devices 102 having the same configuration as the reception station device 102(0) are included.

In FIG. 3, the reception station device 102(0) includes a reception signal conversion unit 301, a CP removal unit 302, a channel estimation unit 303, a transmission signal conversion unit 304, a DFT 305, an FDE 306, an IDFT 307, a data signal demodulation unit 308, an information bit detection unit 309, and antennas ATr(0) to ATr(M−1).

Similar to the reception signal conversion unit 207 of the transmission station device 101, the reception signal conversion unit 301 includes an RF unit, an ADC unit, a pulse shaping unit, and the like, and frequency-converts the high frequency signal received by the antenna ATr into a baseband signal. Here, the reception signal conversion unit 301 outputs the information on the reception weight $W_R(z)$ (det[H(z)]) received from the transmission station device 101 to the FDE 306, which will be described below, and outputs the data signal and the training signal received from the transmission station device 101 to the CP removal unit 302. The information on the reception weight $W_R(z)$ may be demodulated by the reception signal conversion unit 301 and output to the FDE 306, or may have a demodulating function in the FDE 306.

The CP removal unit 302 performs processing of removing the CP added to the data signal and the training signal output by the reception signal conversion unit 301 (CP removing processing). The data signal is output to the DFT 305, and the training signal is output to the channel estimation unit 303.

The channel estimation unit 303 estimates CIR based on the training signal transmitted from the transmission station device 101 (channel estimation processing). Here, the channel estimation unit 303 of the reception station device 102(0) estimates CIR($H_{0,0}(z)$, $H_{1,0}(z)$, . . . , $H_{N-1,0}(Z)$) between the antenna ATt(0) to ATt(N-1) and the antenna ATr(0) of the transmission station device 101. The channel estimation unit 303 transmits information on the estimated CIR from the transmission signal conversion unit 304 to the transmission station device 101. Similarly, the channel estimation unit 303 of each of the reception station devices 102(2) to 102(M-1) estimates CIR between the antennas, and transmits information on the estimated CIR to the transmission station device 101.

The transmission signal conversion unit 304 includes a pulse shaping unit, a DAC unit, an RF unit, and the like, converts information on CIR(H(z)) output by the channel estimation unit 303 or the like into a high frequency signal, and transmits the high frequency signal from the antenna ATr, similar to the transmission signal conversion unit 206 of the transmission station device 101. A function of a modulation unit that modulates the CIR information into the baseband signal may be included in the transmission signal conversion unit 304 or may be included in the channel estimation unit 303.

The DFT 305 converts the data signal in the time domain output by the CP removal unit 302 into a data signal in a frequency domain through discrete Fourier transform processing.

The FDE 306 performs equalization processing for using the reception weight $W_R(z)$ (det[H(z)]) calculated by the weight calculation unit 208 of the transmission station device 101 to multiply the signal output by the DFT 305 to remove inter-symbol interference. Here, det[H(z)] is subjected to DFT and converted into a frequency domain, and the inter-symbol interference is removed by dividing the data signal in the frequency domain by det[H(z)] converted into the frequency domain.

The IDFT 307 outputs a data signal obtained by converting the signal in frequency domain output by the FDE 306 into a time domain signal to the data signal demodulation unit 308.

The data signal demodulation unit 308 demodulates the data signal output by the IDFT 307 into information bits and outputs the bit sequence. The data signal demodulation unit 308 may have an error correction and decoding function and a deinterleave function depending on the function of the transmission station device 101.

The information bit detection unit 309 outputs reception data obtained by converting the bit sequence output by the data signal demodulation unit 308 into digital data. The error correction and decoding function or the deinterleave function may be performed on the information bit detection unit 309. When the coding rate adjustment unit 250 adjusts the coding rate on the transmission station device 101 side, information on the adjusted coding rate is transmitted from the transmission station device 101 to the reception station device 102 and output to the data signal demodulation unit 308 or the information bit detection unit 309, and error correction and decoding processing is performed.

Thus, the wireless communication system 100 illustrated in FIG. 3 is capable of avoiding degradation in communication quality due to inter-block interference by adjusting the CP length based on the equivalent CIR length extended by FIR-type transmission beamforming processing in the MIMO-SC-FDE scheme for performing FIR-type transmission beamforming.

Configuration Example (2) of Wireless Communication System 100

Figure 4:
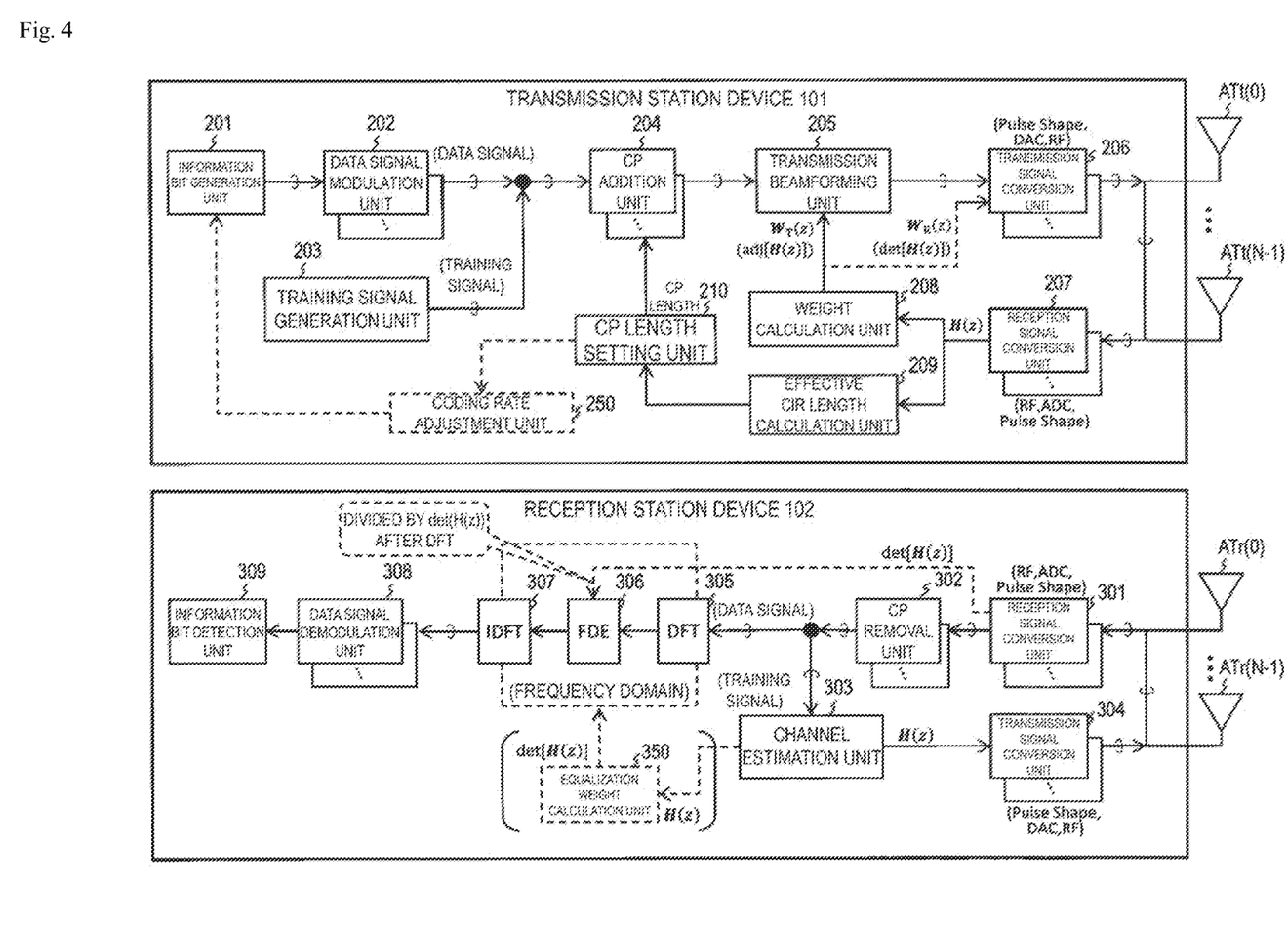
FIG. 4 is a diagram illustrating Configuration Example (2) of the wireless communication system according to the present embodiment.

FIG. 4 illustrates Configuration Example (2) of the wireless communication system 100 according to the present embodiment. Here, a difference between FIGS. 3 and 4 is a difference regarding whether the wireless communication system 100 is MU-MIMO or SU-MIMO, and FIG. 4 illustrates a configuration example of SU-MIMO. Each block of Configuration Example (2) illustrated in FIG. 4 has the same function as the block denoted by the same reference sign of Configuration Example (1) illustrated in FIG. 3.

In FIG. 4, a configuration of the transmission station device 101 is basically the same as that of the transmission station device 101 of FIG. 3. Further, in FIG. 3, the transmission station device 101 performs communication with the plurality of reception station devices 102 of the reception station devices 102(0) to 102(M-1), whereas the transmission station device 101 in FIG. 4 performs communication with one reception station device 102.

In FIG. 4, the reception station device 102 has the same basic configuration and functions as the reception station device 102(0) illustrated in FIG. 3, but the reception station device 102 includes N antennas Atr from an antenna ATr(0) to an antenna ATr(N-1), and has a function for receiving signals of a plurality of (N) streams. Thus, each block of the reception station device 102 illustrated in FIG. 4 corresponds to a plurality of streams of signals. For example, the reception signal conversion unit 301 converts each of high frequency signals received by the plurality of antennas Atr into a baseband signal and outputs the baseband signal to the CP removal unit 302. The plurality of data signals and the plurality of training signals from which the CP has been removed by the CP removal unit 302 are output to the DFT 305 and the channel estimation unit 303, respectively.

In FIG. 4, the channel estimation unit 303 estimates CIR based on the training signal transmitted from the transmission station device 101, similar to the channel estimation unit 303 of FIG. 3. Here, the channel estimation unit 303 of FIG. 4 estimates CIR($H_{0,0}(z)$, $H_{1,0}(z)$, . . . , $H_{N-1,N-1}(z)$) between the antennas ATt(0) to ATt(N-1) of the transmission station device 101 and the antennas ATr(0) to ATr(N-1) of the reception station device 102, and obtains, for example, H(z) shown in Equation (5). The channel estimation unit 303 transmits information on the estimated CIR from the transmission signal conversion unit 304 to the transmission station device 101.

On the other hand, the DFT 305 converts the data signals of the plurality of streams in the time domain output by the CP removal unit 302 into data signals in the frequency domain through discrete Fourier transform processing. The FDE 306 performs removal of the inter-symbol interference from the converted data signal in the frequency domain using the reception weight $W_R(z)$ (det[H(z)]) received from the transmission station device 101. Thereafter, the IDFT 307 converts the signals into signals of a plurality of streams in a time domain and outputs signals to the data signal demodulation unit 308. The data signal demodulation unit 308 demodulates each of the signals of the plurality of streams output from the IDFT 307 into information bits and outputs a bit sequence. The information bit detection unit 309 outputs the reception data obtained by converting the bit sequence of the plurality of streams output by the data signal demodulation unit 308 into digital data.

The coding rate adjustment unit 250 adjusts the coding rate so that transmission efficiencies before and after adjusting the CP length become the same based on the CP length set by the CP length setting unit 210, as in the case of Configuration Example (1).

Thus, the wireless communication system 100 of Configuration Example (2) illustrated in FIG. 4 is capable of avoiding degradation in communication quality due to the inter-block interference by adjusting the CP length based on the equivalent CIR length extended by FIR-type transmission beamforming processing in a MIMO-SC-FDE scheme for performing FIR type transmission beamforming, as in the wireless communication system 100 of Configuration Example (1) described with reference to FIG. 3.

Configuration Example (3) of Wireless Communication System 100

Figure 5:
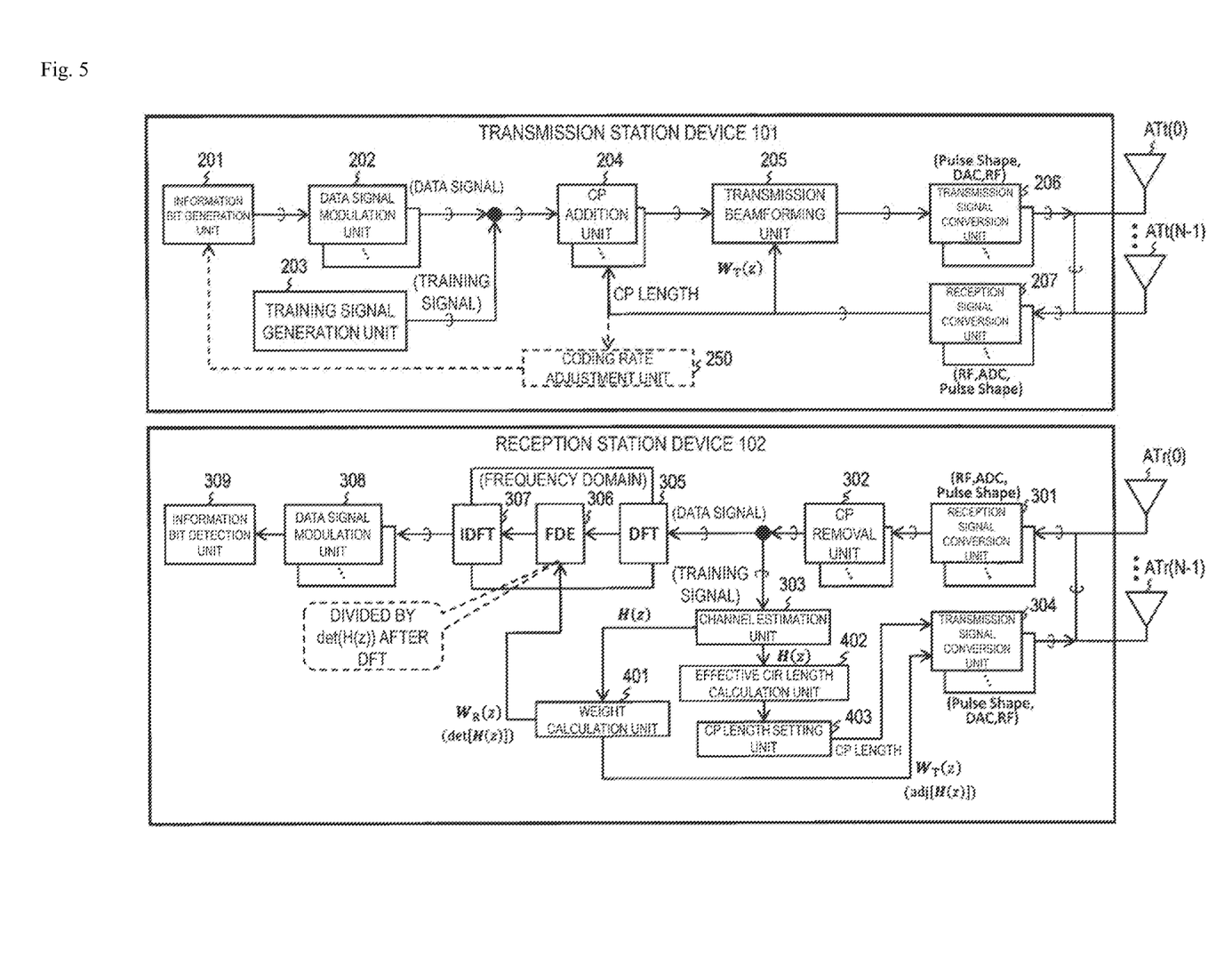
FIG. 5 is a diagram illustrating Configuration Example (3) of the wireless communication system according to the present embodiment.

FIG. 5 illustrates Configuration Example (3) of the wireless communication system 100 according to the present embodiment. Here, both the wireless communication systems 100 of FIGS. 4 and 5 show an example of SU-MIMO. In Configuration Example (2) of FIG. 4, the weight calculation unit 208, the effective CIR length calculation unit 209, and the CP length setting unit 210 are disposed on the transmission station device 101 side, whereas in Configuration Example (3) of FIG. 5, a weight calculation unit 401, an effective CIR length calculation unit 402, and a CP length setting unit 403 are disposed on the reception station device 102 side. The weight calculation unit 401, the effective CIR length calculation unit 402, and the CP length setting unit 403 of Configuration Example (3) have the same functions as those of the weight calculation unit 208, the effective CIR length calculation unit 209, and the CP length setting unit 210 of Configuration Example (2). Further, in FIGS. 4 and 5, other blocks having the same reference signs function in the same manner.

In FIG. 5, the transmission station device 101 includes the information bit generation unit 201, the data signal modulation unit 202, the training signal generation unit 203, the CP addition unit 204, the transmission beamforming unit 205, the transmission signal conversion unit 206, the reception signal conversion unit 207, and antennas ATt(0) to ATt(N−1). In Configuration Example (3) illustrated in FIG. 5, the reception signal conversion unit 207 receives information on the transmission weight $W_T(z)$ and the CP length from the reception station device 102, outputs the transmission weight $W_T(z)$ to the transmission beamforming unit 205, and outputs the CP length to the CP addition unit 204.

Here, in Configuration Example (3) of FIG. 5, description of the same operations as in Configuration Example (1) and Configuration Example (2) will be omitted, and different parts will be described.

In FIG. 5, the reception signal conversion unit 207 of the transmission station device 101 receives a signal including information on the CP length and the transmission weight $W_T(z)$ from the reception station device 102, converts the signal into a baseband signal, and outputs the baseband signal to the CP addition unit 204 and the transmission beamforming unit 205. A function of a demodulation unit that demodulates the information on the CP length and the transmission weight $W_T(z)$ from the baseband signal may be included in the reception signal conversion unit 207 or may be included in the CP addition unit 204 and the transmission beamforming unit 205. The CP addition unit 204 adds a CP to the transmission signal based on the input CP length, and the transmission beamforming unit 205 performs transmission beamforming processing on the transmission signals of the plurality of streams using the input transmission weight $W_T(z)$.

The coding rate adjustment unit 250 adjusts the coding rate so that the transmission efficiencies before and after adjusting the CP length are the same based on the CP length set in the CP addition unit 204, as in Configuration Example (1) or Configuration Example (2).

In FIG. 5, the reception station device 102 includes the reception signal conversion unit 301, the CP removal unit 302, the channel estimation unit 303, the transmission signal conversion unit 304, the DFT 305, the FDE 306, the IDFT 307, the data signal demodulation unit 308, the information bit detection unit 309, the weight calculation unit 401, the effective CIR length calculation unit 402, the CP length setting unit 403, and the antennas ATr(0) to ATr(M−1).

The channel estimation unit 303 estimates CIR based on the training signal transmitted from the transmission station device 101. Here, the channel estimation unit 303 of the reception station device 102 estimates CIR($H_{0,0}(z)$, $H_{1,0}(z)$, ..., $H_{N-1,N-1}(z)$) between the antennas including the antennas ATt(0) to ATt(N−1) and the antenna ATr(0) to ATr(N−1) of the transmission station device 101. The channel estimation unit 303 outputs information on the estimated CIR to the weight calculation unit 401 and the effective CIR length calculation unit 402.

The weight calculation unit 401 uses CIR(H(z)) estimated by the channel estimation unit 303 to calculate the transmission weight $W_T(z)$ for allowing the transmission beamforming unit 205 of the transmission station device 101 to perform the transmission beamforming processing and the reception weight $W_R(z)$ for allowing the FDE 306 to perform the inter-symbol interference equalization processing, similar to the weight calculation unit 208 of Configuration Example (1) and Configuration Example (2). Here, as described in Equations (3) and (4), the transmission weight $W_T(z)$ is adj[H(z)], and the reception weight $W_R(z)$ is det[H(z)]. The transmission weight $W_T(z)$ is transmitted from the transmission signal conversion unit 304 to the transmission station device 101, and the reception weight $W_R(z)$ is output to the FDE 306. det[H(z)] of the reception weight $W_R(z)$ is converted into det[H(z)] in the frequency domain through DFT processing and divided by the data signal in the frequency domain in the FDE 306 so that inter-symbol interference is removed. The processing after the IDFT 307 is the same as that of Configuration Example (2).

The effective CIR length calculation unit 402 calculates the respective effective CIR lengths ($L_{m,n}$) for CIR($H_{m,n}(z)$) between the antennas of H(z), similar to the effective CIR length calculation unit 209 of Configuration Example (1) and Configuration Example (2).

The CP length setting unit 403 calculates, for example, the CIR length of each item of the determinant det[H(z)] in Equation (6) based on the effective CIR length calculated by the effective CIR length calculation unit 402, similar to the CP length setting unit 210 of Configuration Example (1) and Configuration Example (2). Further, the CP length setting unit 403 calculates the maximum CIR length among the CIR lengths of the respective items, and transmits the maximum CIR length as the CP length from the transmission signal conversion unit 304 to the transmission station device 101. In the transmission station device 101, information on the CP length received by the reception signal conversion unit 207 is output to the CP addition unit 204 and set.

Thus, in the wireless communication system 100 of Configuration Example (3) according to the present embodiment, the reception station device 102 estimates CIR based on the training signal transmitted from the transmission station device 101, transmits a transmission weight for removing the inter-stream interference calculated based on a CIR estimation result (corresponding to the inter-user interference in the case of MU-MIMO of Configuration Example (1)) to the transmission station device 101, and performs the transmission beamforming processing. At the same time, the reception station device 102 transmits the maximum CIR length in the respective items of the determinant det[H(z)] as the CP length to the transmission station device 101, and the transmission station device 101 sets the maximum CIR length as a CP length of the CP addition unit 204. Thus, because the wireless communication system 100 of Configuration Example (3) according to the present embodiment adjusts the CP length according to the CIR length, the range of inter-block interference of the reception signal on the reception station device 102 side falls within the CP length, making it possible to remove the inter-block interference.

CP Length Adjustment Processing Common to Configuration Examples (1) to (3)

Next, a CP length adjustment processing common to the wireless communication systems 100 in Configuration Examples (1) to (3) according to the embodiment will be described.

Figure 6:
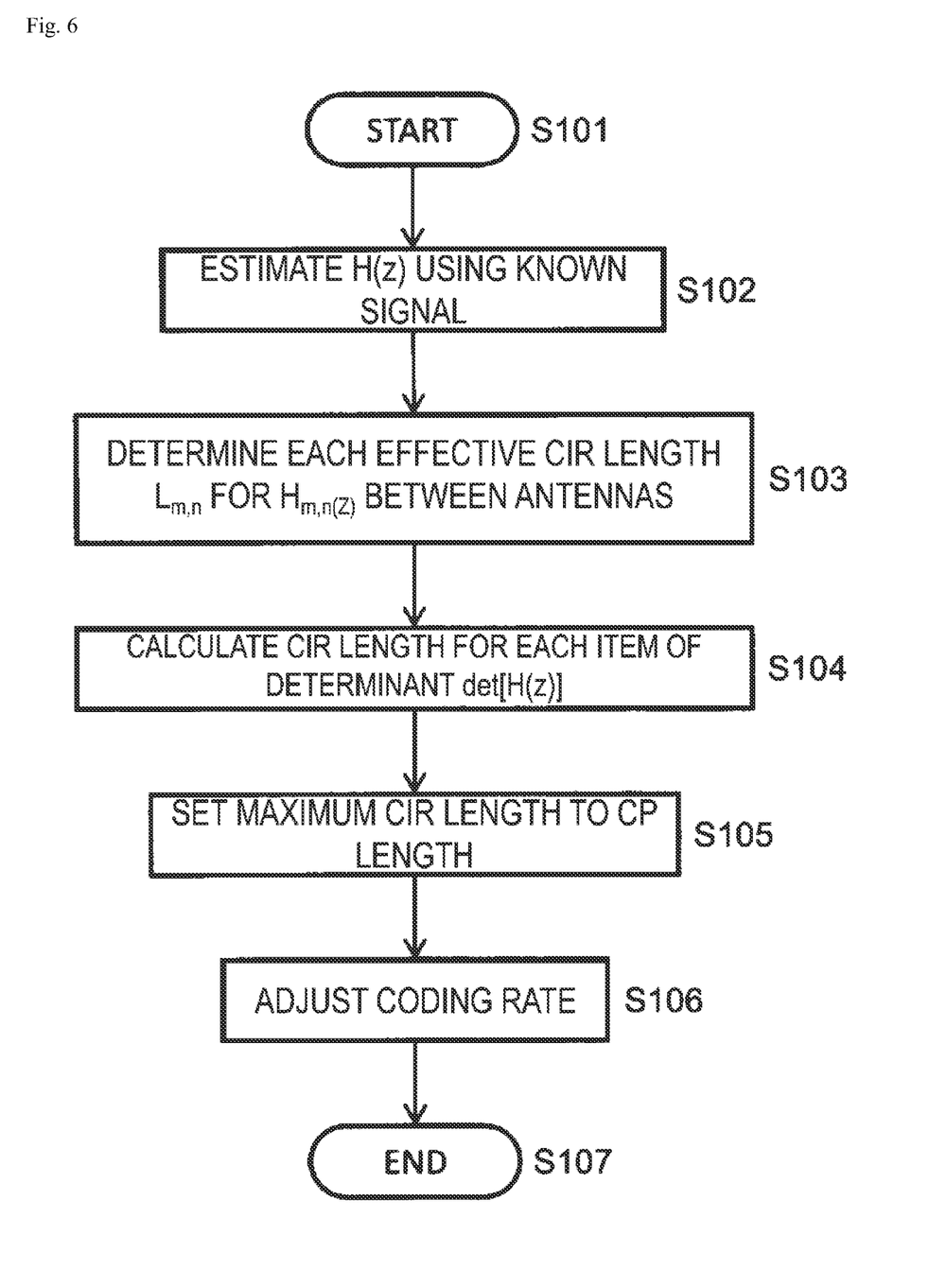
FIG. 6 is a diagram illustrating an example of CP length adjustment processing in the wireless communication system.

FIG. 6 illustrates an example of the CP length adjustment processing in the wireless communication system 100. The processing of FIG. 6 is common to the wireless communication systems 100 of Configuration Examples (1) to (3).

In step S101, the wireless communication system 100 starts the CP length adjustment processing.

In step S102, the channel estimation unit 303 estimates CIR(H(z)) based on the training signal (known signal) transmitted from the transmission station device 101.

In step S103, the effective CIR length calculation unit 209 (or the effective CIR length calculation unit 402) determines each effective CIR length $L_{m,n}$ for the CIR($H_{m,n}(z)$) between the antennas.

In step S104, the effective CIR length calculation unit 209 (or the effective CIR length calculation unit 402) calculates the CIR length of each item of the determinant det[H(z)].

In step S105, the CP length setting unit 210 sets the maximum CIR length among the CIR lengths of the respective items of the determinant det[H(z)] calculated in step S104 to the CP length added by the CP addition unit 204.

In step S106, the coding rate adjustment unit 250 adjusts the coding rate when forward error correction (FEC) coding is performed by the information bit generation unit 201 or the data signal modulation unit 202. A method of adjusting the coding rate will be described below.

In step S107, the wireless communication system 100 ends the CP length adjustment processing.

Thus, the wireless communication system 100 according to the present embodiment is capable of avoiding degradation in communication quality due to the inter-block interference by adjusting the CP length based on the equivalent CIR length extended by FIR type transmission beamforming processing in the MIMO-SC-FDE scheme for performing FIR-type transmission beamforming.

Coding Rate Adjustment Processing

Next, coding rate adjustment processing performed in the coding rate adjustment unit 250 described in Configuration Examples (1) to (3) and step S106 described with reference to FIG. 6 will be described.

Figure 7:
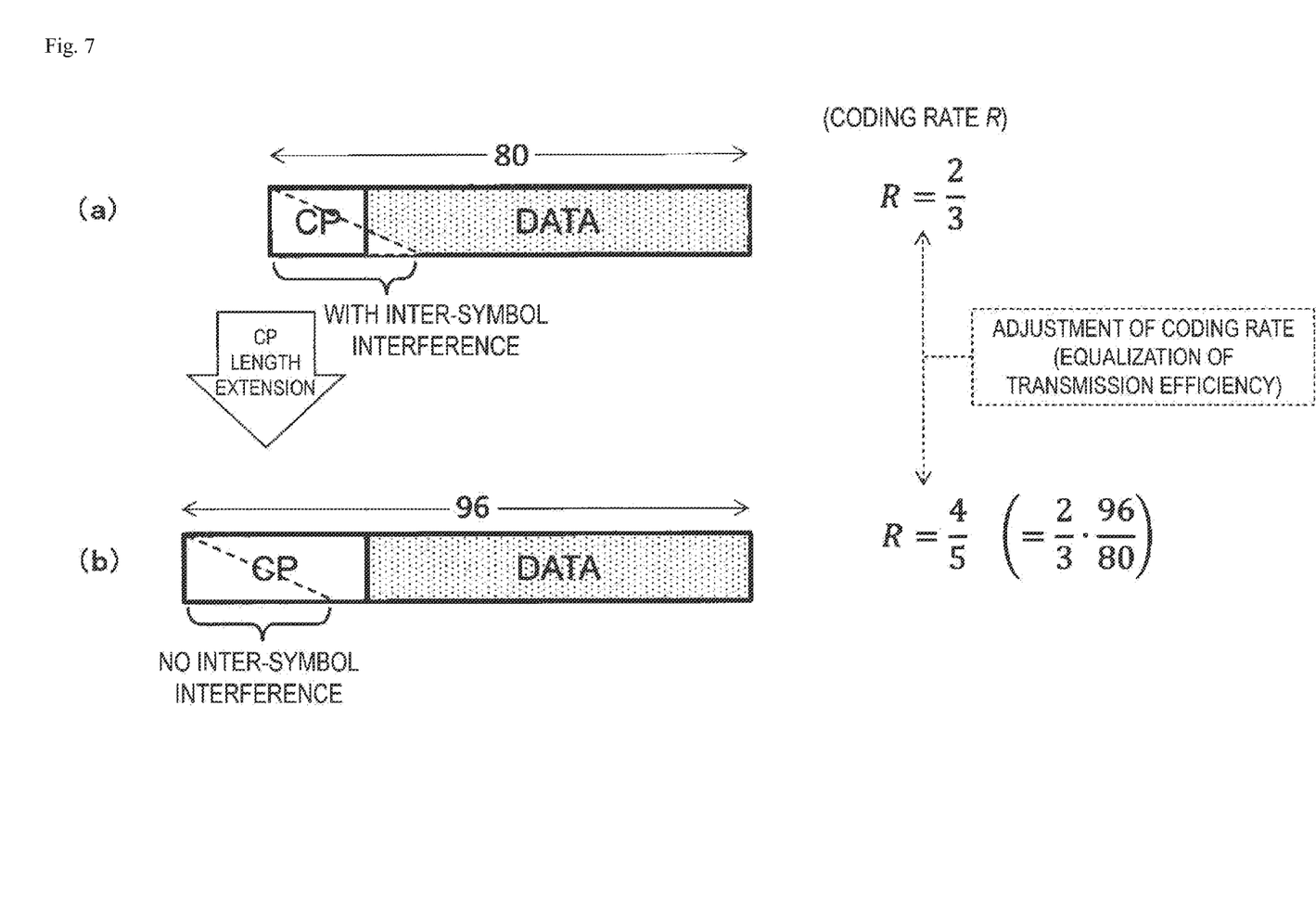
FIG. 7 is a diagram illustrating an example of a block length before and after adjusting the CP length.

FIG. 7 illustrates an example of the block length before and after adjusting the CP length. FIG. 7(a) illustrates a block before adjusting the CP length, and for example, a block length after CP has been added to the data is 80 bits. FIG. 7(b) illustrates a block after adjusting the CP length, and because the CP length is extended, for example, a block length after CP has been added to data is 96 bits. Here, when the coding rates before and after adjusting the CP length are the same as 2/3, an information amount of DATA transmitted in one block is the same before and after adjusting the CP length and thus, there arises a problem that the transmission efficiency is degraded by the increase in the block length from 80 bits to 96 bits due to the extension of the CP length.

Thus, in the wireless communication system 100 according to the present embodiment, processing for increasing the coding rate is performed so that the transmission efficiencies are the same before and after the extension of the CP length. For example, the coding rate R after the extension of the CP length can be obtained as in Equation (13).

$$R = (2/3) \times (96/80) = 4/5 \qquad (13)$$

In Equation (13), when the block length before CP length extension is 80, the coding rate before CP length extension is 2/3, the block length after CP length extension is 96, and the coding rate after CP length extension is 4/5, the transmission efficiencies become the same before and after the CP length extension.

As described above, the wireless communication system 100 according to the present embodiment is capable of avoiding degradation in communication quality due to the inter-block interference by adjusting the CP length based on the equivalent CIR length extended by FIR-type transmission beamforming processing in the MIMO-SC-FDE scheme for performing FIR-type transmission beamforming. Further, in the wireless communication system 100 according to the present embodiment, it is possible to prevent degradation of transmission efficiency due to the adjustment of the CP length by adjusting the coding rate.

REFERENCE SIGNS LIST

100 Wireless communication system
101 Transmission station device
102 Reception station device
150 FIR-type transmission beamforming unit
151 FDE
201 Information bit generation unit
202 Data signal modulation unit
203 Training signal generation unit
204 CP addition unit
205 Transmission beamforming unit
206, 304 Transmission signal conversion unit
207, 301 Reception signal conversion unit
208, 401 Weight calculation unit
209, 402 Effective CIR length calculation unit
210, 403 CP length setting unit
250 Coding rate adjustment unit
302 CP removal unit
303 Channel estimation unit 305 DFT
306 FDE
307 IDFT
308 Data signal demodulation unit
309 Information bit detection unit
ATt, Atr Antenna

The invention claimed is:

1. A wireless communication system comprising: a transmission station device and a reception station device, the wireless communication system being configured to perform transmission using a multiple-input multiple-output (MIMO)-single carrier (SC)-frequency domain equalization (FDE) (MIMO-SC-FDE) scheme between the transmission station device and the reception station device, wherein the transmission station device comprises:
  a training signal generation unit configured to generate a predetermined known signal for the reception station device to estimate a channel response;
  a CP addition unit configured to add a CP with a predetermined cyclic prefix (CP) length for removing inter-block interference for a transmission signal block; and
  a transmission beamforming unit configured to perform transmission beamforming processing in a time domain using a transmission weight for removing inter-antenna interference, the reception station device comprises:
  a CP removal unit configured to remove the CP added to a received signal;
  a channel estimation unit configured to receive the known signal and estimate a channel response; and
  an equalization unit configured to perform equalization for removing inter-symbol interference in a frequency domain using a reception weight, and either of the transmission station device or the reception station device is provided with:
  a weight calculation unit configured to calculate the transmission weight and the reception weight based on the channel response;
  an effective CIR length calculation unit configured to calculate an effective channel input response (CIR) length between a plurality of antennas based on the channel response; and
  a CP length setting unit configured to calculate CIR lengths of a plurality of items of the reception weight based on the effective CIR length and set a maximum CIR length among the CIR lengths of the plurality of items to the CP length.

2. The wireless communication system according to claim 1, further comprising a coding rate adjustment unit configured to adjust a coding rate based on the CP length set by the CP length setting unit to equalize a transmission efficiency before adjusting the CP length and a transmission efficiency after adjusting the CP length.

3. A wireless communication method for performing transmission using a multiple-input multiple-output (MIMO)-single carrier (SC)-frequency domain equalization (FDE) (MIMO-SC-FDE) scheme between a transmission station device and a reception station device, the method comprising, by the transmission station device:
  generating, as a training signal, a predetermined known signal for the reception station device to estimate a channel response;
  adding a cyclic prefix (CP) with a predetermined CP length for removing inter-block interference for a transmission signal block; and
  transmission beamforming for forming a transmission beam in a time domain using a transmission weight for removing inter-antenna interference the method comprising, by the reception station device: removing the CP added to a received signal;
  receiving the known signal and estimating the channel response; and
  removing inter-symbol interference in a frequency domain using a reception weight, and the method comprising, by either the transmission station device or the reception station device, calculating the transmission weight and the reception weight based on the channel response, calculating an effective channel input response (CIR) length between a plurality of antennas based on the channel response, and calculating CIR lengths of a plurality of items of the reception weight based on the effective CIR length and setting a maximum CIR length among the CIR lengths of the plurality of items to the CP length.

4. The wireless communication method according to claim 3, further comprising:
  based on the CP length set by the setting of the CP length, adjusting a coding rate to equalize a transmission efficiency before adjusting the CP length and a transmission efficiency after adjusting the CP length.

5. A transmission station device configured to perform transmission to and from a reception station device using a multiple-input multiple-output (MIMO)-single carrier (SC)-frequency domain equalization (FDE) (MIMO-SC-FDE) scheme, the transmission station device comprising:
  a training signal generation unit configured to generate a predetermined known signal for the reception station device to estimate a channel response;
  a CP addition unit configured to add a cyclic prefix (CP) with a predetermined CP length for removing inter-block interference for a transmission signal block; a transmission beamforming unit configured to perform transmission beamforming in a time domain using a transmission weight for removing inter-antenna interference;
  a weight calculation unit configured to calculate, based on the channel response estimated by the reception station device, the transmission weight and a reception weight used for equalization in the reception station device;
  an effective CIR length calculation unit configured to calculate, based on the channel response, an effective channel input response (CIR) length between a plurality of antennas; and
  a CP length setting unit configured to calculate CIR lengths of a plurality of items of the reception weight based on the effective CIR length and set a maximum CIR length among the CIR lengths of the respective items to the CP length.

6. The transmission station device according to claim 5, further comprising a coding rate adjustment unit configured to adjust a coding rate based on the CP length set by the CP length setting unit to equalize a transmission efficiency before adjusting the CP length and a transmission efficiency after adjusting the CP length.

* * * * *